Patented Feb. 18, 1930

1,747,539

UNITED STATES PATENT OFFICE

HEINRICH CLINGESTEIN, OF COLOGNE, GERMANY, ASSIGNOR TO GENERAL ANILINE WORKS, INC., OF NEW YORK, N. Y., A CORPORATION OF DELAWARE

AZO DYESTUFF

No Drawing. Application filed October 22, 1928, Serial No. 314,308, and in Germany September 22, 1926.

The present invention relates to new azo dyestuffs and the products dyed therewith.

The process of manufacture in accordance with the invention is by diazotizing a benzidine sulfonic- or -carboxylic acid or a derivative thereof, coupling with two molecules of a middle component capable of further diazotization, again diazotizing and coupling with one molecule of a sulfonic acid of the probable formula

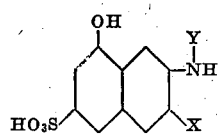

wherein X stands for hydrogen or the sulfonic acid group, Y for hydrogen or a benzene nucleus which may be substituted f. i. by sulfonic acid or carboxylic acid groups and with one molecule of a sulfonic acid of the probable formula

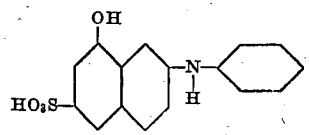

wherein the benzene nucleus may be further substituted, for instance, by sulfonic acid or carboxylic acid groups.

The dyestuffs obtainable in accordance with the invention are quite extraordinarily suitable for direct printing on silk. In addition to the very high solubility necessary for direct printing, they are distinguished by very satisfactory fastness to water. The printings obtained from the dyestuffs prepared in accordance with the invention vary generally from blue-black or brownish-black to intense black shades.

The dyestuffs form in the dry state dark grey to black powders, soluble in strong sulfuric acid with dark blue to bluish black colorations. They probably correspond to the general formula

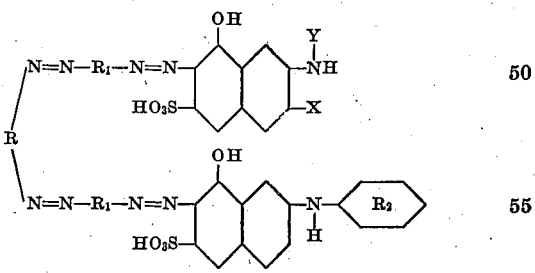

wherein R represents a benzidine residue being substituted by sulfonic acid- or carboxylic acid groups, $R_1$ stands for an aromatic residue, X stands for hydrogen or a sulfonic acid group, Y stands for hydrogen or a benzene nucleus which may be substituted and wherein the benzene nuclei of the end components may be further substituted, for example, by sulfonic acid or carboxylic acid groups.

The following example illustrates my invention without limiting it thereto:

*Example.*—17.2 parts by weight of benzidine-ortho-disulfonic acid are tetrazotized at 10° C. with 6.9 parts by weight of sodium nitrite and hydrochloric acid. A solution of 13.7 parts by weight of cresidine in hydrochloric acid is added and sodium acetate until the solution is no longer acid to Congo red. When coupling is complete the product is at 60° C. isolated from the solution, after rendering the same acid to Congo red; it is made into a paste and further tetrazotized by stirring for several hours at ordinary temperature with 6.9 parts by weight of nitrite and hydrochloric acid. The isolated diazo compound is coupled with a sodium carbonate solution of 18 parts by weight of meta-carboxy-phenyl-2:8-amino-naphthol-6-sulfonic acid and 15.9 parts by weight of 2:8-amino-naphthol-3:6-disulfonic acid. The dyestuff is isolated in the customary manner. It forms a black powder, soluble in strong sulfuric acid with a blackish blue coloration, dyes silk deep brownish-black shades and probably corresponds in its free form to the formula

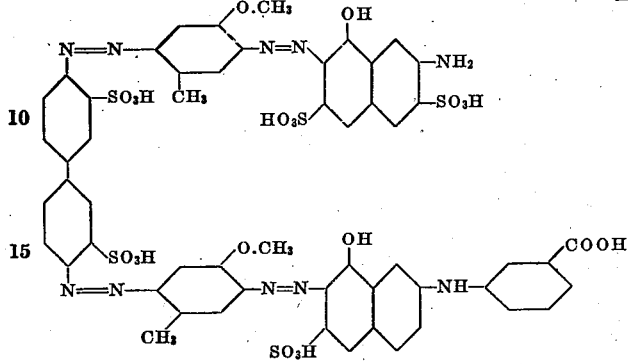

I claim:
1. New azodyestuffs of the probable general formula:

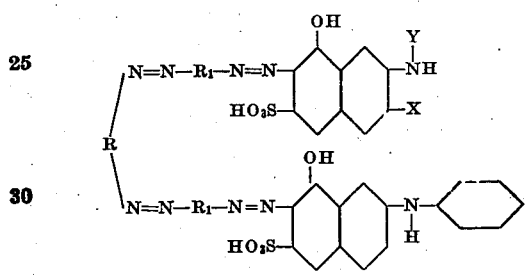

wherein R stands for a benzidine residue containing sulfonic- or carboxylic acid groups, $R_1$ means aromatic nuclei, X means hydrogen which may be substituted by a sulfonic acid group, Y means hydrogen which may be substituted by a benzene nucleus, and wherein the benzene nuclei of the end components may be further substituted, said dyestuffs being in the dry state dark grey to black powders soluble in strong sulfuric acid with dark blue to blueish black colorations.

2. The azodyestuff having in its free form the probable formula:

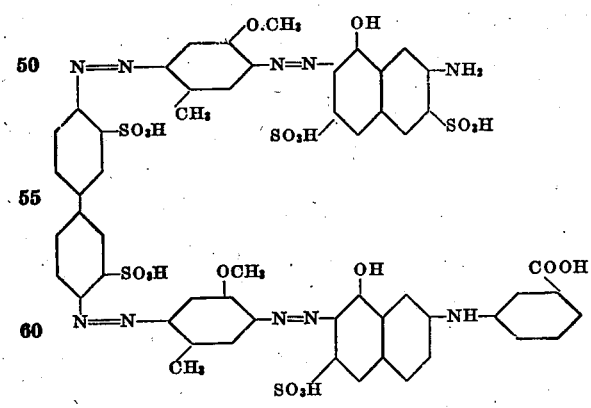

forming a black powder, soluble in strong sulfuric acid with a blackish-blue coloration.

3. Silk, dyed with the dyestuffs claimed in claim 1.
4. Silk, dyed with the dyestuffs claimed in claim 2.

In testimony whereof I have hereunto set my hand.

HEINRICH CLINGESTEIN. [L. S.]